(No Model.)

J. G. McALPINE.
WHEEL.

No. 447,893. Patented Mar. 10, 1891.

Witnesses:
Arthur B. Jenkins.
A. F. Langdon

Inventor,
James G. McAlpine,
by
Harry R. Williams.
atty.

UNITED STATES PATENT OFFICE.

JAMES G. McALPINE, OF BAKERSFIELD, CALIFORNIA, ASSIGNOR OF THREE-FOURTHS TO JAMES G. McALPINE, JR., AND GEORGE S. McALPINE, OF SAME PLACE.

WHEEL.

SPECIFICATION forming part of Letters Patent No. 447,893, dated March 10, 1891.

Application filed July 16, 1890. Serial No. 358,947. (No model.)

*To all whom it may concern:*

Be it known that I, JAMES G. McALPINE, a citizen of the United States, residing at Bakersfield, in the county of Kern and State of California, have invented certain new and useful Improvements in Wheels, of which the following is a full, clear, and exact specification.

The invention relates to the class of wheels which are capable of being expanded to tighten the parts when desired to prevent rattling and the rapid wearing which occurs when the parts become loose.

The object of the invention is to provide a simple, cheap, and strong wheel wherein the tire may be quickly tightened by a simultaneous radial movement of the spokes which forces the felly outward and expands it to the tire, which may be held in place without the usual bolts, thus avoiding the removal, shortening, and resetting of the tire, in order to tighten it or insert a new spoke.

Figure 1:
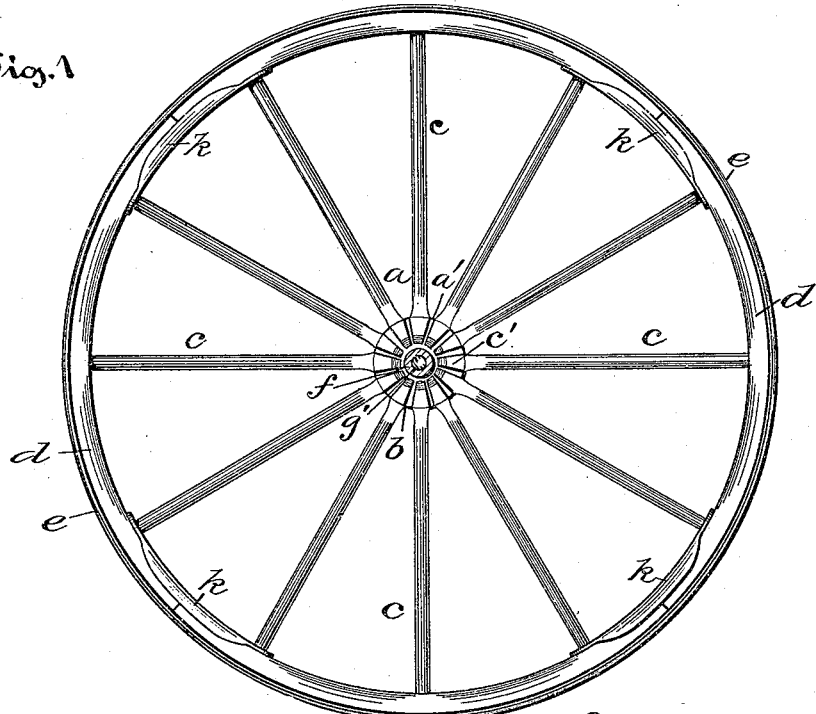
Figure 2:
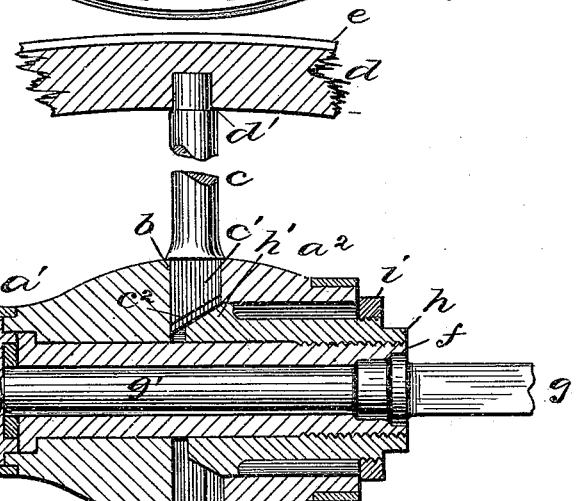
Figure 3:
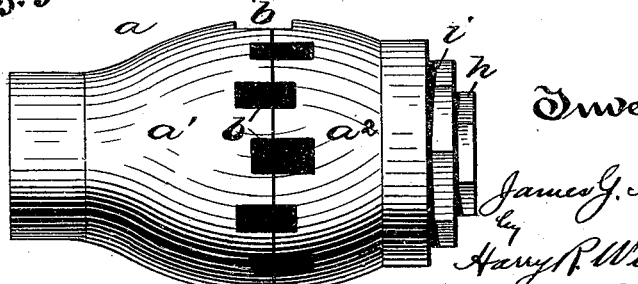

Referring to the accompanying drawings, Figure 1 is a face view of the wheel with part of the hub removed. Fig. 2 is an enlarged central sectional view of a portion of the wheel. Fig. 3 is a side view of the hub with the spokes removed.

In the views, the letter $a$ indicates the hub of the wheel, which may be of wood or iron, of the usual shape, but is preferably formed in two sections $a'$ $a^2$, divided through the center of the spoke-mortises $b$.

The inner end of the tenon $c'$ of each spoke $c$ sets somewhat loosely in its mortise and is beveled or formed on an incline, while the outer end of each spoke fits into a socket $d'$ in the felly $d$, which is preferably made in sections that fit together closely and can be held in place by the tire $e$ without the aid of the bolts that usually pass through the tire and felly.

The exterior of a portion of the hub-box $f$, which fits the spindle $g'$ of the axle $g$ in the customary manner, is threaded near one end, and upon this turns a metallic cylinder $h$, which is provided with an interior thread that fits the exterior thread on the box, so that rotation of the cylinder advances it into or withdraws it out of the hub. The inner end of this cylinder is beveled or inclined, forming a conical cylindrical wedge $h'$, which butts against the beveled inner end of the tenons of the spokes, while the outer end of this cylinder is faced so that it may be grasped and rotated by a wrench, and when it is screwed inward the resultant force of the butting inclined faces on the ends of the spokes and the wedge forces the spokes outward with great pressure. If desired, the inclined ends of the spokes may be provided with a metallic cap or shoe $c^2$ to prevent them from being crushed by the pressure of the wedge and to make the parts move with less friction. This radial movement of the spokes forces the felly outward evenly with great pressure against the tire, which may be flat, convex, concave, box, or other desirable shape welded to the desired size. The box $f$ may be provided with the usual wings, or the end may be squared to prevent its rotation in the hub, and a portion of the outer surface of the cylinder $h$ is threaded and bears a clamping-nut or washer $i$, which holds the parts together when the hub is made in two sections, and also clamps and holds the cylinder from rotation when set.

The felly-sections may be secured together or held in line at their junctions by clips $k$, that project over each side of the felly and are held tightly in place by passing under shoulders formed on the two adjacent spokes.

In assembling the device the tenons of the spokes are set in the mortises in the hub in which the box bearing the cylindrical wedge has been secured, the felly-sections placed upon the outer ends of the spokes, the tire set upon the felly, and the cylindrical wedge screwed inward until the spokes are forced outward and tightly press the felly into the tire. When the felly has been sufficiently expanded to tighten the tire and firmly hold it in place, the clamp-washer is screwed upon the cylinder to lock the latter from further rotation, and also to hold the sections of the hub together between the washer and the enlarged end of the box. The wheel is then ready to be slipped upon the spindle of an axle and held there by the usual washered nut. If one or more of the spokes become broken or injured, they can be removed by loosening the wedge and new spokes substituted and the tire set tightly in place without the necessity of shortening or heating and shrinking the tire to place. At any time the felly may be forced outward to tighten the tire by the application of a wrench to the end of the wedge-cylinder, and as the wedge forces all the spokes radially equally the wheel must be true and round. Should the wheel at any time buckle or get out of shape it can be straightened by tightening the spokes by means of the wedge.

The arrangement is simple, cheap, efficient, and can be utilized at any time by the application of a wrench to tighten the wheel without the service of a blacksmith.

I claim as my invention—

A wheel consisting of a sectional hub having a box with an enlarged outer end and an exterior thread on its inner end, a cylinder with a wedge on one end, and an interior thread fitting the thread on the box and an exterior thread bearing a clamping-washer on the opposite end, spokes with inclined ends resting against the wedge and fitting the mortises between the hub-sections, and a felly and tire encircling the spokes, substantially as described, and for the purpose specified.

JAMES G. McALPINE.

Witnesses:
H. R. WILLIAMS,
ARTHUR B. JENKINS.